US012521871B2

(12) United States Patent
Kelch et al.

(10) Patent No.: US 12,521,871 B2
(45) Date of Patent: Jan. 13, 2026

(54) COMPILING ROBOT BEHAVIOR TREES

(71) Applicant: Intrinsic Innovation LLC, Mountain View, CA (US)

(72) Inventors: Timothy Robert Kelch, San Jose, CA (US); Tim Niemueller, Gauting (DE)

(73) Assignee: Intrinsic Innovation LLC, Mountain View, CA (US)

( * ) Notice: Subject to any disclaimer, the term of this patent is extended or adjusted under 35 U.S.C. 154(b) by 219 days.

(21) Appl. No.: 18/537,707

(22) Filed: Dec. 12, 2023

(65) Prior Publication Data

US 2024/0217097 A1    Jul. 4, 2024

Related U.S. Application Data

(60) Provisional application No. 63/435,752, filed on Dec. 28, 2022.

(51) Int. Cl.
*G06F 8/30* (2018.01)
*B25J 9/16* (2006.01)

(52) U.S. Cl.
CPC .................. *B25J 9/1602* (2013.01)

(58) Field of Classification Search
CPC ........................................................ G06F 8/30
See application file for complete search history.

(56) References Cited

U.S. PATENT DOCUMENTS

2005/0154690 A1* 7/2005 Nitta ................ G06F 16/30
                                                    707/E17.058
2016/0277800 A1* 9/2016 Wang ................ H04N 21/466
2021/0263834 A1* 8/2021 Reisner ............... G06F 11/3624
2022/0035339 A1* 2/2022 Saunders ............ G06N 3/008
2022/0067538 A1* 3/2022 Choudhary ........... G06F 8/433

OTHER PUBLICATIONS

Artiminds.com [online], "Why is it worth using . . . ArtiMinds robot programming software solutions?," Apr. 23, 2021, retrieved on Jun. 12, 2024, retrieved from URL<https://www.artiminds.com/robot-programming-software//>, 11.
Ready-robotics.com [online], "Connect all your automation equipment with one hardware-agnostic software platform," Feb. 19, 2016, retrieved on Jun. 12, 2024, retrieved from URL<https://www.ready-robotics.com/>, 9 pages.

* cited by examiner

*Primary Examiner* — Jae U Jeon
(74) *Attorney, Agent, or Firm* — Fish & Richardson P.C.

(57) ABSTRACT

Methods, systems, and apparatus, including computer programs encoded on computer storage media, for translating behavior trees into a target programming language. One of the methods includes receiving a request to translate a behavior tree representing a robotic process into source code of a target language of a target execution system, wherein the behavior tree has links representing parent-child relationships, wherein leaf nodes of the behavior tree are action nodes, and parent nodes of the behavior tree are control nodes. Using a mapping between action node types and target language primitives for the target language, a traversal of the behavior tree generates output code having one or more target language primitives in the target language that, when executed by the target execution system, causes a robot to perform the robotic process.

20 Claims, 4 Drawing Sheets

COMPILING ROBOT BEHAVIOR TREES

CROSS-REFERENCE TO RELATED APPLICATION

This application claims priority to U.S. Provisional Application No. 63/435,752, filed on Dec. 28, 2022. The disclosure of the prior application is considered part of and is incorporated by reference in the disclosure of this application.

BACKGROUND

This specification relates to robotics, and more particularly to planning and executing robotic movements.

Robotics planning refers to scheduling the physical movements of robots in order to perform tasks. For example, an industrial robot that builds cars can be programmed to first pick up a car part and then weld the car part onto the frame of the car. Each of these actions can themselves include dozens or hundreds of individual movements by robot motors and actuators.

Robotics planning has traditionally required immense amounts of manual programming in order to meticulously dictate how the robotic components should move in order to accomplish a particular task. Manual programming is tedious, time-consuming, and error prone.

In addition, robotic programs, once developed for a particular robot model, are generally not usable on different robot types or robot models. Therefore, a lot of effort can be duplicated when implementing a robotic process on multiple different types of robots.

SUMMARY

This specification describes how a robotic system can use event-driven behavior trees having a structure and node types that can be compiled into hardware-specific code that can be executed for a target execution system for a particular robot. This allows the system to translate a hardware-agnostic, behavior-tree representation of desired robot behavior into a hardware-specific, executable representation that can be used to execute the same process in an operating environment for the same or a different robot model. Moreover, the selection of node types and event-driven execution of the behavior trees described in this specification enable a system to generate output code that is intuitive to understand and map back to the original behavior tree representation.

In this specification, a behavior tree is a graph-based data structure representing a robotic process. A behavior tree has nodes and links, with the links establishing parent-child relationships between nodes. A robotic execution system can use an event-driven behavior tree to execute a robotic process by stepping through the nodes according to the node semantics of different types of nodes. As one example, a sequence node having four action nodes as children can represent that the robot should execute the four action nodes in the specified sequence. A behavior tree being event-driven means that evaluation of the behavior tree will remain at some nodes until an associated task or an action, typically performed by a robot or another hardware component in a robotic operating environment, has completed. Event-driven behavior trees are thus distinct from time-based behavior trees that are reevaluated at each tick of an evaluation cycle, which are typically on the order of 1 to 100 Hz or more. Thus, the process represented by the behavior tree is performed once per tree traversal. Additional node semantics of behavior trees will be described in more detail below.

Particular embodiments of the subject matter described in this specification can be implemented so as to realize one or more of the following advantages. Providing the functionality to translate event-driven behavior trees into hardware-specific code allows robotic process developers to develop one representation of a robotic process using behavior trees that can be easily and automatically exported as source code that can be executed in a variety of different target execution environments. This functionality also allows the resulting output program to be executed natively in the target execution environment, which may not have any support for processing behavior trees. The control node structures of the behavior trees described in this specification allow for compilation of the behavior tree into a format that is intuitive and easily mapped to the original behavior tree. This functionality is unlike systems that use time-driven behavior trees, whose ability to be compiled into understandable output code is uncertain or impossible. Therefore, using event-driven behavior trees with the control nodes described below allows for rapid prototyping of processes for specific target execution environments. Event-driven behavior trees also provide a higher level of abstraction at which to design robotic processes, and the techniques described below enable a declarative behavior tree to be compiled into an imperative execution program. This mechanism simplifies the design of robotic processes and makes it easier and faster. In addition, improvements to the process as represented by the behavior tree can be automatically propagated to all translations for all target execution systems.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how a system can translate an event-driven behavior-tree representation of a robotic process into hardware-specific output code for a target execution system. The output code can be code that can be directly executed on the hardware of the target execution system or can be an intermediate representation of such code. The output code can be in any appropriate output language, which can be a general purpose programming language, e.g., C or Python, or a robotics-specific or hardware-specific language.

Figure 1:
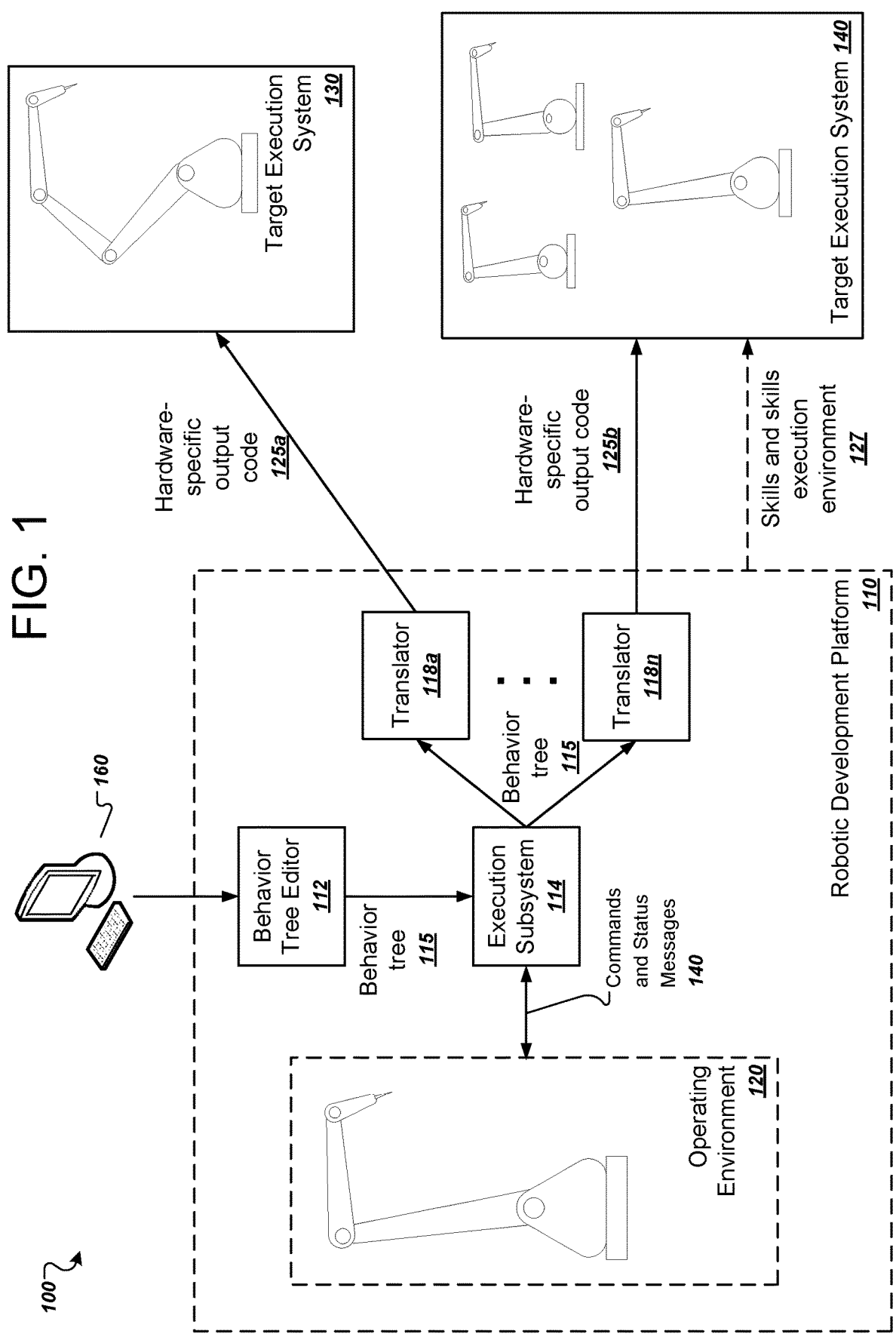
FIG. 1 is a diagram that illustrates an example system.

FIG. 1 is a diagram that illustrates an example system 100. The system 100 is an example of a system that can implement the behavior tree compiling techniques described in this specification.

The system 100 includes a user device 160 and a robotic development platform 110, which is operable to drive a robot in an operating environment 120 using a behavior-tree representation of a robotics process. The robotic development platform 110 can then generate output code that is specific to any number of execution systems, e.g., the execution systems 130 and 140, which do or cannot operate on behavior-tree representations.

This functionality allows the robotic development platform 110 to serve as a centralized tool for the development of robotic processes, which can then be automatically executed on multiple different robot types or models built by different manufacturers.

The robotic development platform 110 includes a number of functional subsystems, including a behavior tree editor 112, an execution subsystem 114, and one or more translators 118a-n. Each of these components can be implemented as computer programs installed on one or more computers in one or more locations that are coupled to each other through any appropriate communications network, e.g., an intranet or the Internet, or combination of networks.

The behavior tree editor 112 is a user input system that allows a user to create, design, or modify an event-driven behavior tree. For example, the behavior tree editor can provide a user interface to the user device 160 that allows the addition, deletion, or modification of nodes and links in the tree. The user interface can be a graphical user interface, e.g., as part of an integrated development environment, or the user interface can be command-line based. Alternatively or in addition, a user can upload a textual representation of a behavior tree, e.g., as written in a particular behavior tree language. The user device 160 can be any appropriate computing device for providing commands to the robotic development platform 110, e.g., a smart phone, a tablet computer, a laptop computer, or a desktop computer, to name just a few examples.

The execution subsystem 114 can drive the actions of the robot in the operating environment 120, which can be, for example, a workcell. The execution subsystem 114 provides commands to and receives status messages 140 from the operating environment. In doing so, the execution subsystem 114 can control a real-time robotics control system with hard real-time requirements. Real-time software control systems are software systems that are required to execute within strict timing requirements to achieve normal operation. The timing requirements often specify that certain actions must be executed or outputs must be generated within a particular time window in order for the system to avoid entering a fault state. In the fault state, the system can halt execution or take some other action that interrupts normal operation.

In a typical scenario, the execution subsystem receives a behavior tree 115 and executes the robotic process represented by the behavior tree 115 by stepping through the nodes, and, at each node, performing an operation represented by the node semantics of the node. Leaf nodes in the behavior tree are action nodes that represent an action for the robot to perform. Thus, when the execution subsystem 114 encounters a leaf node, the execution subsystem 114 kicks off the appropriate action on the robot in the operating environment 120.

As mentioned above, the behavior tree 115 can be an event-driven behavior tree whose semantics dictate that evaluation or execution of the behavior tree remains with particular action nodes until the task associated with the action node completes, either successfully or unsuccessfully. Thus, a complete traversal, which need not visit all nodes, is performed once for each iteration of the process the behavior tree represents. This model is unlike time-based behavior trees that are repeatedly re-executed at each tick of an evaluation cycle. Furthermore, the event-driven nature of the behavior tree, and the semantics of some of the control nodes, enable compilation into intuitive output code for a target execution system.

The evaluation of each node of the behavior tree can have an associated node outcome, which can be any appropriate status indicator or return value. For example, the evaluation of each node can be associated with a value indicating whether the node outcome was success or failure. The node outcomes can then be used by parent nodes to control evaluation of the behavior tree according to the node semantics of the parent nodes.

The system includes a number of translators 118a-n, which are software modules or software subsystems that can use the techniques described in this specification to take a behavior tree as input and generate output code that is specific to particular target execution systems respectively. Each translator 118 can be specific to a particular output language, to a particular robot model, to a particular robot manufacturer, or to a particular operating system used by a robot.

Thus, a first translator 118a can generate hardware-specific output code 125a for execution by a first target execution system 130. And a second translator 118n can generate hardware-specific output code 125b for a different second target execution system 140. In some cases, the output code can be executed by multiple different robot models that are compatible with the output language.

Optionally, the robotic development platform 110 can provide one or more skills and a skills execution environment 127 to a target execution system, e.g., the target execution system 140. Although many basic robotic functionalities can be effectuated by target language primitives, some behavior trees that are developed and evaluated by the robotic development platform 110 may include action nodes that call arbitrarily complex skill functionality that is driven by a skills execution system and which do not have a direct mapping to target language primitives in the target execution system. Thus, the robotic development platform 110 can provide the software and data required to execute such skills in a skills execution environment. Then, when the output code is executed by the target execution system, the output code can make a callback to the installed skills execution environment in order to initiate the skill associated with the action node. The target execution systems 130 and 140 can then execute the hardware-specific output code 125a-b to essentially replicate the robotic process that was represented by the original behavior tree 115. This can occur even though the target execution systems 130 and 140 might not have any concept of behavior trees or software required to interpret or process behavior trees. Therefore, the robotic development platform 110 can be used to develop robotic processes, which can then be automatically exported and executed by a number of different target execution systems.

Figure 2:
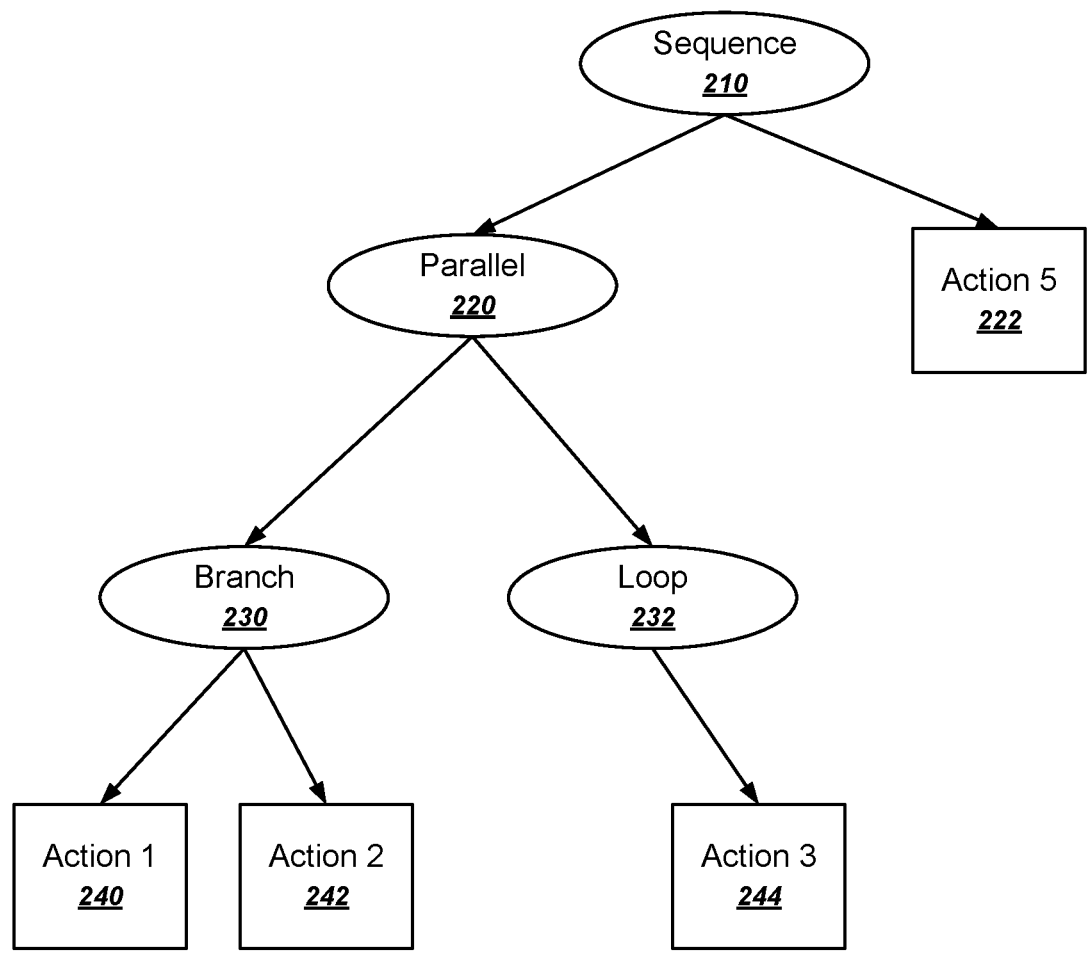
FIG. 2 is a diagram of an example behavior tree.

FIG. 2 is a diagram of an example behavior tree. The oval-shaped nodes 210, 220, 230, and 232 are control nodes, and the square-shared nodes 240, 242, 244, and 222 are action nodes. A system can represent a robotic process with a behavior tree as shown.

Node semantics of the control nodes dictates how an execution system will walk through nodes of the behavior tree to direct the robotic process. As one example, a sequence node, e.g., the sequence node 210 dictates that the execution subsystem should process all of its child nodes in a particular order specified by the behavior tree. Thus, the execution system would process the sequence node 220 before processing the action node 222.

On the other hand, a parallel node 220 specifies that the execution subsystem should process all of its child nodes at least partially in parallel. The mechanism for implementing parallel execution in practice depends on the configuration of the operating environment. For example, the execution subsystem can command multiple components in the workcell, e.g., a joint move and a gripper close, by providing commands sequentially but which are executed by their respective components at least partially in parallel. Alternatively or in addition, the execution subsystem can launch multiple threads that execute in parallel to effectuate the specified actions.

Action nodes, e.g., the action nodes 240, 242, 244, and 222, represent distinct actions to be performed by a robot. For example, an action node can represent moving an end effector of a robot to a particular location in a workcell. Action nodes can also represent more sophisticated tasks, such as making a weld or inserting a connector into a socket. In some implementations, the action nodes are implemented using a skill, which is a collection of preconfigured data and software, e.g., a machine learning control model, that provides a robot a capability to perform a task or a portion of a task represented by an action node. Each skill may itself encapsulate a state machine that guides the robot through one or more subtasks in order to effectuate the full task. Suitable techniques for configuring robots to execute tasks using skills are described in commonly owned U.S. patent application Ser. No. 16/880,869, filed on May 21, 2020, which is herein incorporated by reference.

The example behavior tree also includes a branch node 230 and a loop node 232. The semantics of the branch node 230 represent an if-else control structure with an associated condition. If the condition holds, the system can evaluate the first action node 240. Otherwise, the system can evaluate the second action node 242.

The example behavior tree also includes a loop node 232. The loop node can re-execute its subtree until a particular condition is satisfied, which can include a counter reaching a particular number of iterations. Thus, the loop node 232 can cause the system to re-execution the action node 244 for a particular number of iterations.

The particular node semantics of the event-driven behavior tree illustrated in FIG. 2, including the branch node 230 and the loop node 232, provide the ability to translate the behavior tree into output code in a target language that is intuitive to understand for users of the target execution system. This functionality is different from other behavior trees that do not represent branching and loops as nodes in the tree.

Figure 3:
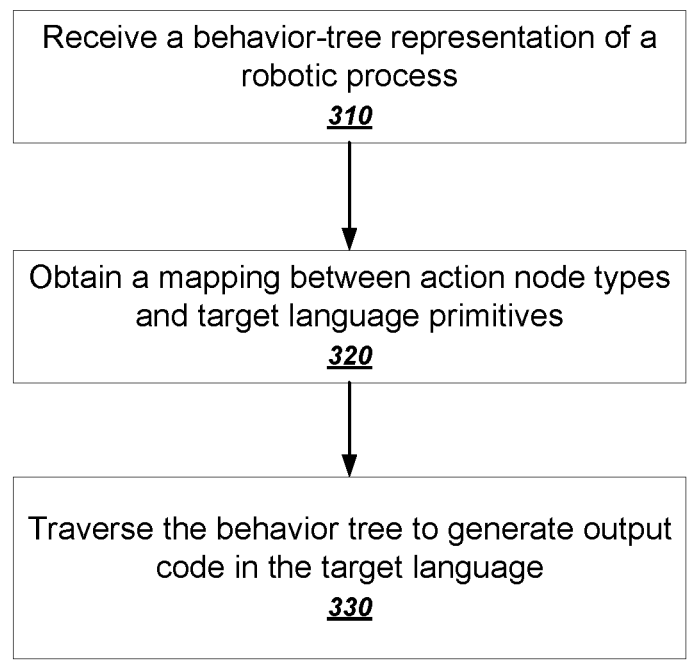
FIG. 3 is a flowchart of an example process for translating a behavior-tree representation into output code for a target execution system.

FIG. 3 is a flowchart of an example process for translating a behavior-tree representation into output code for a target execution system. The example process can be performed by a system of one or more computers in one or more locations and programmed in accordance with this specification. The example process will be described as being performed by a system of one or more computers, e.g., one of the translators 118a-n of FIG. 1.

The system receives a behavior-tree representation of a robotic process (310). As described above, a user can use a robotic development platform to generate a behavior tree for controlling a robotic process. The behavior tree can include control nodes and action nodes, where the action nodes are leaf nodes with no children.

The system obtains a mapping between action node types and target language primitives (320). A target language primitive is a segment of code in the target language that effectuates a basic robot function in the target execution system. Target language primitives effectuate basic robot functions, which can include joint moves, Cartesian moves, sensor readings, equipment enabling and disabling, and gripper opening and closing, to name just a few examples.

A target language primitive can take one or more arguments as input that will control execution of the robot while in operation. For example, a Cartesian move to a particular location can take x, y, and z position coordinates in Cartesian space as input arguments.

Many target language primitives can be implemented by preinstalled libraries of the target execution system. Thus, the mappings can be derived from function definitions of the libraries. Alternatively or in addition, the target language primitives can include code written by a developer in the target language that effectuates the action on the target execution system.

The system traverses the behavior tree to generate output code in the target language (330). The system can perform a recursive traversal of the behavior tree, and, at each node, can generate output code to effectuate the semantics of each node when executed by the target execution system. The system can continually populate a text file with the generated output code as is traverses the behavior tree recursively. This process is described in more detail below with reference to FIG. 4.

Figure 4:
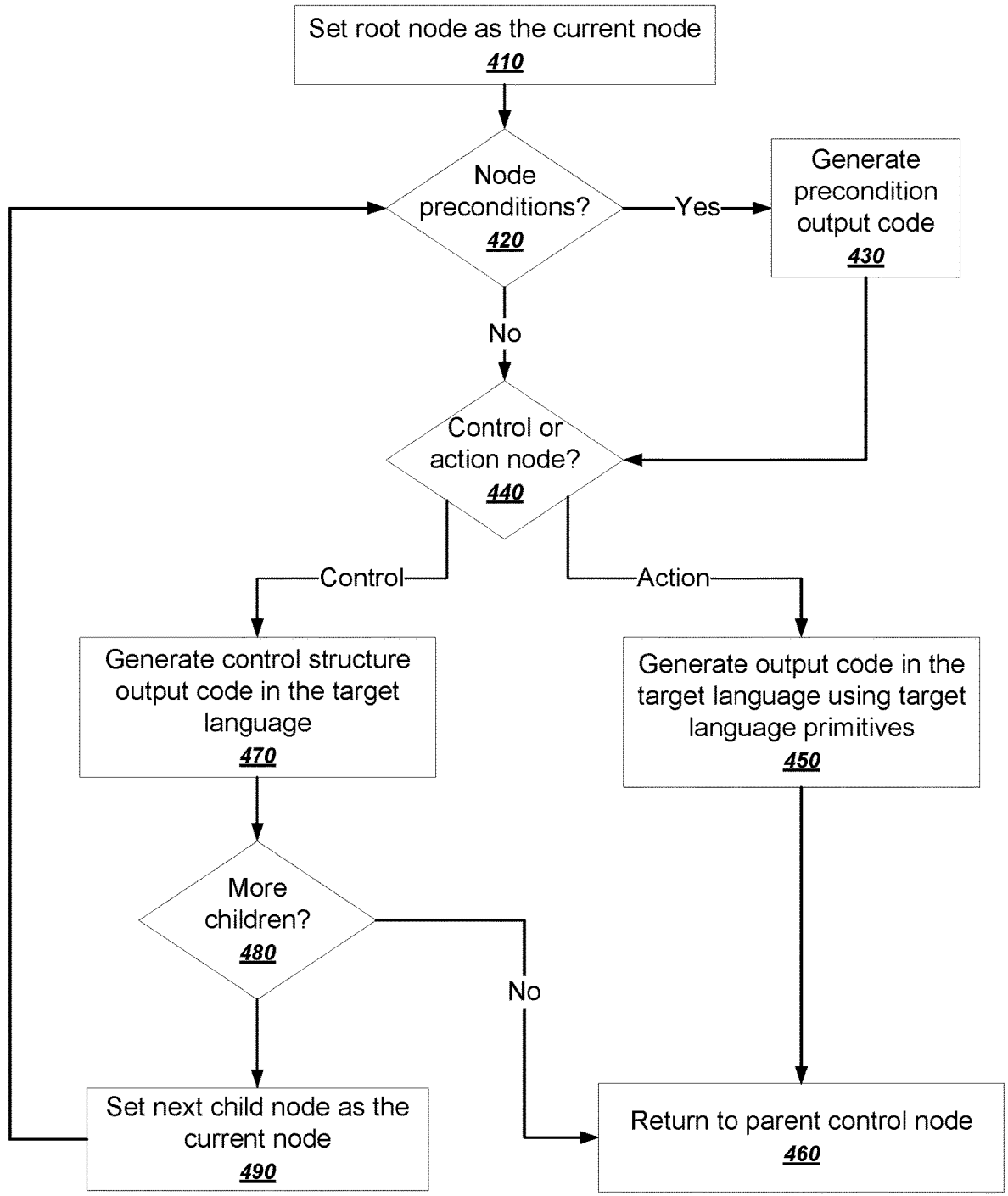
FIG. 4 is a flowchart of an example process for generating output code by traversing a behavior tree.

FIG. 4 is a flowchart of an example process for generating output code by traversing a behavior tree. The example process can be performed by a system of one or more computers in one or more locations and programmed in accordance with this specification. The example process will be described as being performed by a system of one or more computers, e.g., one of the translators 118a-n of FIG. 1.

The system sets the root node of the tree as the current node (410). As the system will be recursively generating code as it traverses the tree, the system can maintain a variable that represents which node is currently being processed.

The system determines whether the current node has preconditions (420). A node precondition is a condition that must hold before the node is executed. When the behavior tree is being processed by an execution subsystem of a robotics development platform that executes processes from behavior trees, a node precondition can cause the execution subsystem to skip processing the node, which causes the execution subsystem to return to the parent node of the current node.

In some implementations, the behavior trees used by the robotics development platform do not have separate condition nodes. Rather, the preconditions for execution of a node are attributes associated with control nodes and action nodes. This makes the behavior tree smaller, simpler, and more intuitive for human readers.

As one example of a node precondition, an action node that uses a gripper to place a grasped object in a container can be decorated with a precondition that the object is still grasped. This precondition can involve checking one or more sensors, such as a force sensor or an object detection sensor, to determine whether the object is grasped.

Another example node precondition is whether an object is present, which can be used for any appropriate action that manipulates the object. For example, a gripping action can have a node precondition that requires the object to be detected before attempting to grasp.

Another example node precondition is the uncertainty of a particular detection. For example, an action node that requires determining the pose of an object can use a pose estimator that has a particular confidence value. The precondition can specify that the action node should not be attempted if the confidence value does not satisfy a confidence threshold.

Another example node precondition is whether other hardware is in a ready state. The node precondition can prevent the action node from being executed until the hardware status indicates that the hardware is in the ready state.

Another example node precondition is whether an end effector is free and not holding another object. If the node is evaluated and sensors indicate that the end effector is holding an object already, the system can mark the action associated with the node as failing. A similar precondition is whether an object to be lifted by an end effector is within a weight limit for a robot. This situation can arise in practice when different robots having different acceptable payloads are working together to lift objects in a workcell.

Thus, if a current node has a precondition, the system can generate precondition output code in the target language (branch to 430). The precondition output code effectuates the check on the node preconditions, for example, by inserting a branch condition in the output code, e.g., an if statement or an if-else structure. As part of this process, the system can use target language primitives to populate the condition being checked. For example, the system can use a target language primitive to check whether an end effector is in a correct location before starting execution of an action.

Another example node precondition is an interlock on a particular program variable or operating environment resource. For example, a node can have a precondition that checks to see whether a particular space in a workcell is occupied by another robot. If so, the robot can wait until the space becomes unoccupied. To effectuate an interlock precondition in the target language, the system can generate a loop that waits and then periodically rechecks the precondition until it is true. As another example, a node interlock can represent a robot waiting for a particular workpiece to become available, e.g., as it is moved by a conveyor or placed by another robot.

After checking for node preconditions (420), the system determines whether the node is a control node or an action node (440).

If the current node is an action node (440), the system generates output code in the target language using target language primitives (branch to 450). As described above, the system can use a mapping between the action node type and a target language primitive to populate the output code file with code in the target language that will effectuate the task represented by the action node.

In some cases, action nodes return node outcomes, e.g., success or failure values, to represent whether the action succeeded or failed. To represent node outcomes in the target programming language, the system can structure the code for each action node as a function call having a return value. Alternatively or in addition, the system can use other named variables that represent node outcomes, e.g., success or failure of actions, that can be checked by control code generated for the parent node.

In some situations, the system may not find a mapping between an action node type and a particular target language primitive. This can happen, for example, when the action node in the behavior tree was a custom skill node that has no clear implementation in the target language. In that case, the system can raise an error to indicate that the compilation failed.

Alternatively or in addition, the system can provide a callback functionality to a skills execution system that implements skills in the target execution environment. For example, the target execution environment can install software received from the robotic development platform that enables a robot to execute arbitrary skills. This can involve the target execution system executing software that is written in a different language or for a different robotic operating environment than the ordinary execution environment for the target language. For example, the skills execution system can run on different hardware or in a different thread than the main thread in the target language.

After generating the output code for the action node (450), the system returns to the parent control node of the action node (460). In other words, the system can go up one level in the recursive process to resume processing of the parent node of the action node. If the action node was the root node, the process can end.

If the current node was a control node (440), the system generates control structure output code in the target language (branch to 470). The system can maintain a mapping between control node types and control structures in the target language. A number of these mappings will now be described.

As described above, a sequence node executes its children in a predefined sequence. Therefore, when generating output code for a sequence node, the order of execution will implicitly be generated by the traversal of the behavior tree. Thus, in some implementations no output control structures need to be generated for a sequence node. The node outcome of a selector node can be success if execution of all children was attempted or failure if execution of one or more children was not attempted.

A parallel node executes its children at least partially in parallel. To effectuate parallel execution on the target execution system, the system can generate code that launches, on the target execution system, one or more additional threads to effectuate the actions for each of the children. In most cases, the actions will all start before any of the actions finish. The node outcome of a parallel node can be success if execution of all children was attempted.

Another example robotic control node type is a selector node. A selector node when evaluated will attempt its children in sequence until one succeeds, meaning that the node outcome of a child node was success. The remaining child nodes, if any, are skipped. The node outcome of the selector node then becomes the node outcome of the child that was selected, while unselected child nodes are ignored or not executed.

To implement a selector node in the target programming language, the system can generate a looping structure that calls the code for each child node in sequence and includes a break statement whenever the return value for any child node succeeds. Alternatively or in addition, the system can generate a switch structure that evaluates preconditions of the child nodes in order until a child node is found whose precondition is satisfied.

Another example robotic control node is a fallback node. The fallback node is similar to the selector node and can have a defined ordering of child nodes. But the fallback node will pay attention to the node outcomes of the child nodes and cause the system to keep evaluating the child nodes in order until one of the child nodes has a successful node outcome or until no child nodes remain. In addition, upon one of the child nodes of the fallback node having a successful outcome, the rest of the child nodes in the ordering are skipped. The fallback node will have a successful node outcome if one of its child nodes had a successful outcome. Only if all child nodes fail does the fallback node have a failing node outcome. One example of using a fallback node is to use different pose estimation techniques for determining the pose of an object. As long as one pose estimator succeeds, the fallback node itself succeeds as well.

To implement a fallback node in a target programming language, the system can use nested if-then control structures that attempt each of the associated code blocks in order until one succeeds.

Another example robotic control node is a retry node. The retry node has a single child that is retried for a particular number of times before failing but otherwise immediately returns a node outcome of success on the first successful attempt. Retry nodes are useful for tasks like pose detection. For example, a retry node can be used to attempt pose detection at most two times before failing.

To implement a retry node in the target programming language, the system can generate a loop structure having a maximum number of iterations and a break condition when one of the attempts succeeds.

Another example robotic control node is a branch node. A branch node has an associated condition that is used to select between child nodes. To implement a branch node in the target programming language, the system can generate an if-structure or an if-then structure to check the condition. The node outcome of a branch node can be the node outcome of the child node that was selected according to the condition.

Another example robotic control node is a loop node. A loop node can re-execute its subtree for a particular number of iterations, which can be specified by a predetermined maximum number of iterations or can be specified by a condition that must hold on each iteration. To implement a loop node in the target programming language, the system can generate a looping structure that specifies executing a portion of code for a particular number of iterations, e.g., as a for-loop or a while loop having a counter or a particular condition. The node outcome of a loop node can be successful if all iterations were attempted or can be the node outcome of the last iteration over the child node.

Another example robotic control node is a sub-tree node. The sub-tree node can be used to encapsulate other behavior trees. For example, a sub-tree node in a first behavior tree can have an argument that is the name of a second behavior tree. Evaluating the sub-tree node thus causes the system to initiate evaluation of the named behavior tree.

Using sub-tree nodes enables rapid, intuitive, and easy composition of behavior trees of behavior trees. To implement a sub-tree node in the target programming language, the system can generate a function call for each sub-tree node to a function having output code that was generated for the associated behavior tree.

The system determines whether there are more child nodes to evaluate (480). If so, the system sets the next child node as the current node and recursively starts the process again with the newly selected current node (branch to 420). If not, the system returns control to the parent control node, which can include returning a success or failure value.

After returning back to the root node, the system will have generated a text collection having all source code in the target language required to effectuate the process represented by the behavior tree. The source code can then be executed in a target execution environment to cause a robot to perform the robotic process. Alternatively or in addition, a user can modify the source code to adapt the source code to the local environment. Therefore, the compilation of the behavior tree can be used as a starting point for locally adapting the process for the target execution environment.

In this specification, a robot is a machine having a base position, one or more movable components, and a kinematic model that can be used to map desired positions, poses, or both in one coordinate system, e.g., Cartesian coordinates, into commands for physically moving the one or more movable components to the desired positions or poses. In this specification, a tool is a device that is part of and is attached at the end of the kinematic chain of the one or more moveable components of the robot. Example tools include grippers, welding devices, and sanding devices.

In this specification, a task is an operation to be performed by a tool. For brevity, when a robot has only one tool, a task can be described as an operation to be performed by the robot as a whole. Example tasks include welding, glue dispensing, part positioning, and surfacing sanding, to name just a few examples. Tasks are generally associated with a type that indicates the tool required to perform the task, as well as a position within a workcell at which the task will be performed.

In this specification, a motion plan is a data structure that provides information for executing an action, which can be a task, a cluster of tasks, or a transition. Motion plans can be fully constrained, meaning that all values for all controllable degrees of freedom for the robot are represented explicitly or implicitly; or underconstrained, meaning that some values for controllable degrees of freedom are unspecified. In some implementations, in order to actually perform an action corresponding to a motion plan, the motion plan must be fully constrained to include all necessary values for all controllable degrees of freedom for the robot. Thus, at some points in the planning processes described in this specification, some motion plans may be underconstrained, but by the time the motion plan is actually executed on a robot, the motion plan can be fully constrained. In some implementations, motion plans represent edges in a task graph between two configuration states for a single robot. Thus, generally there is one task graph per robot.

In this specification, a motion swept volume is a region of the space that is occupied by at least a portion of a robot or tool during the entire execution of a motion plan. The motion swept volume can be generated by collision geometry associated with the robot-tool system.

In this specification, a transition is a motion plan that describes a movement to be performed between a start point and an end point. The start point and end point can be represented by poses, locations in a coordinate system, or tasks to be performed. Transitions can be underconstrained by lacking one or more values of one or more respective controllable degrees of freedom (DOF) for a robot. Some transitions represent free motions. In this specification, a free motion is a transition in which none of the degrees of freedom are constrained. For example, a robot motion that simply moves from pose A to pose B without any restriction on how to move between these two poses is a free motion. During the planning process, the DOF variables for a free motion are eventually assigned values, and path planners can use any appropriate values for the motion that do not conflict with the physical constraints of the workcell.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method performed by one or more computers, the method comprising:
   receiving a request to translate a behavior tree representing a robotic process into source code of a target language of a target execution system, wherein the behavior tree has links representing parent-child relationships, wherein leaf nodes of the behavior tree are action nodes, and parent nodes of the behavior tree are control nodes;
   obtaining a mapping between action node types and target language primitives for the target language; and
   performing a traversal of the behavior tree to generate output code having one or more target language primitives in the target language that, when executed by the target execution system, causes a robot to perform the robotic process.

2. The method of claim 1, wherein performing the traversal comprises generating, at each node encountered during the traversal, output code corresponding to the node encountered during the traversal.

3. The method of claim 2, wherein generating output code corresponding to each node comprises:
   determining that a particular node has one or more associated preconditions; and
   in response, generating precondition source code that conditions further execution of source code associated with the node on one or more precondition criteria.

4. The method of claim 3, wherein the particular node has a precondition representing a resource interlock, and
   wherein generating the output code comprises generating a loop structure that waits for the resource interlock to be acquired.

5. The method of claim 1, wherein the mapping between action node types and target language primitives comprises a mapping between one or more action node types and respective library functions of the target execution system, and
   wherein generating the output code comprises adding calls to the library functions corresponding to one or more action nodes.

6. The method of claim 5, wherein the control nodes comprises at least one parallel node having multiple child nodes, and
   wherein generating the output code comprises adding code that causes two task to be executed at least partially in parallel on the target execution system.

7. The method of claim 1, wherein the robot of the target execution system is a different robot model or robot type than a second robot used to generate the behavior tree.

8. The method of claim 1, further comprising:
   determining that a particular action type does not have an entry in the mapping between action node types and target language primitives; and
   in response, raising an error.

9. The method of claim 1, further comprising:
   determining that a particular action type is mapped to a skill of a skill execution subsystem; and
   in response, generating output code that, when executed by the target execution system, invokes the skill execution subsystem to perform a task.

10. The method of claim 1, wherein the control nodes comprise a fallback node having multiple child nodes, and
    wherein generating the output code comprises generating code that causes the target execution system to attempt multiple actions at least partially in parallel until one action succeeds.

11. A system comprising:
    one or more computers and one or more storage devices storing instructions that are operable, when executed by the one or more computers, to cause the one or more computers to perform operations comprising:
    receiving a request to translate a behavior tree representing a robotic process into source code of a target language of a target execution system, wherein the behavior tree has links representing parent-child relationships, wherein leaf nodes of the behavior tree are action nodes, and parent nodes of the behavior tree are control nodes;

obtaining a mapping between action node types and target language primitives for the target language; and performing a traversal of the behavior tree to generate output code having one or more target language primitives in the target language that, when executed by the target execution system, causes a robot to perform the robotic process.

12. The system of claim 11, wherein performing the traversal comprises generating, at each node encountered during the traversal, output code corresponding to the node encountered during the traversal.

13. The system of claim 12, wherein generating output code corresponding to each node comprises:

determining that a particular node has one or more associated preconditions; and in response, generating precondition source code that conditions further execution of source code associated with the node on one or more precondition criteria.

14. The system of claim 13, wherein the particular node has a precondition representing a resource interlock, and wherein generating the output code comprises generating a loop structure that waits for the resource interlock to be acquired.

15. The system of claim 11, wherein the mapping between action node types and target language primitives comprises a mapping between one or more action node types and respective library functions of the target execution system, and wherein generating the output code comprises adding calls to the library functions corresponding to one or more action nodes.

16. The system of claim 15, wherein the control nodes comprises at least one parallel node having multiple child nodes, and wherein generating the output code comprises adding code that causes two task to be executed at least partially in parallel on the target execution system.

17. The system of claim 11, wherein the robot of the target execution system is a different robot model or robot type than a second robot used to generate the behavior tree.

18. The system of claim 11, wherein the operations further comprise:

determining that a particular action type does not have an entry in the mapping between action node types and target language primitives; and in response, raising an error.

19. The system of claim 11, wherein the control nodes comprise a fallback node having multiple child nodes, and wherein generating the output code comprises generating code that causes the target execution system to attempt multiple actions at least partially in parallel until one action succeeds.

20. One or more non-transitory computer storage media encoded with computer program instructions that when executed by one or more computers cause the one or more computers to perform operations comprising:

receiving a request to translate a behavior tree representing a robotic process into source code of a target language of a target execution system, wherein the behavior tree has links representing parent-child relationships, wherein leaf nodes of the behavior tree are action nodes, and parent nodes of the behavior tree are control nodes;

obtaining a mapping between action node types and target language primitives for the target language; and performing a traversal of the behavior tree to generate output code having one or more target language primitives in the target language that, when executed by the target execution system, causes a robot to perform the robotic process.

* * * * *